United States Patent
Cappello et al.

(10) Patent No.: US 12,033,284 B2
(45) Date of Patent: *Jul. 9, 2024

(54) SYSTEM, METHOD AND STORAGE MEDIUM FOR IDENTIFICATION OF ONE OR MORE ASPECTS OF A VIRTUAL ENVIRONMENT

(71) Applicant: Sony Interactive Entertainment Inc., Tokyo (JP)

(72) Inventors: Fabio Cappello, London (GB); Maurizio Cerrato, London (GB); Rosario Leonardi, London (GB); Gregory James Bedwell, London (GB); Nigel John Williams, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,511

(22) Filed: Nov. 15, 2022

(65) Prior Publication Data

US 2023/0071832 A1 Mar. 9, 2023

Related U.S. Application Data

(63) Continuation of application No. 17/114,596, filed on Dec. 8, 2020, now Pat. No. 11,538,223.

(30) Foreign Application Priority Data

Dec. 17, 2019 (GB) ..................................... 1918608

(51) Int. Cl.
*G06T 19/00* (2011.01)
*H04N 13/117* (2018.01)
(Continued)

(52) U.S. Cl.
CPC ......... *G06T 19/003* (2013.01); *H04N 13/117* (2018.05); *H04N 13/279* (2018.05); *H04N 13/282* (2018.05)

(58) Field of Classification Search
CPC . G06T 19/003; G06T 2211/441; G06T 13/00; G06T 15/20; G06T 15/40;
(Continued)

(56) References Cited

U.S. PATENT DOCUMENTS

| | | |
|---|---|---|
| 6,057,847 A | 5/2000 | Jenkins |
| 6,118,456 A | 9/2000 | Cooper |

(Continued)

FOREIGN PATENT DOCUMENTS

EP 3839893 A1 6/2021

OTHER PUBLICATIONS

Combined Search and Examination Report for corresponding Application GB1918608.9, 9 pages, dated Sep. 17, 2020.
(Continued)

*Primary Examiner* — Maurice L. McDowell, Jr.
(74) *Attorney, Agent, or Firm* — Matthew B. Dernier, Esq.

(57) ABSTRACT

A system for improving a discovery process for a virtual environment, the system comprising an environment discovery unit operable to perform a discovery process comprising navigation of the virtual environment and identification of one or more aspects of the virtual environment, a performance analysis unit operable to evaluate the effectiveness of the discovery process, and a discovery update unit operable to modify future operation of the environment discovery unit in dependence upon the evaluation.

16 Claims, 4 Drawing Sheets

(51) Int. Cl.
  *H04N 13/279* (2018.01)
  *H04N 13/282* (2018.01)
(58) Field of Classification Search
  CPC .... G06T 15/30; H04N 13/117; H04N 13/279; H04N 13/282; G06F 3/04815
  See application file for complete search history.

(56) References Cited

U.S. PATENT DOCUMENTS

| | | | |
|---|---|---|---|
| 6,684,255 B1 | | 1/2004 | Martin |
| 8,576,235 B1 | | 11/2013 | Sumner |
| 10,766,136 B1 | | 9/2020 | Porter |
| 11,538,223 B2 * | | 12/2022 | Cappello ................ G06T 15/40 |
| 2005/0253872 A1 | | 11/2005 | Goss |
| 2006/0155615 A1 * | | 7/2006 | Loo ....................... G06Q 30/02 |
| | | | 705/14.1 |
| 2009/0051681 A1 | | 2/2009 | Sharp |
| 2010/0005423 A1 | | 1/2010 | Finn |
| 2011/0191365 A1 | | 8/2011 | Betzler |
| 2012/0081369 A1 * | | 4/2012 | Li ........................ G06T 19/003 |
| | | | 345/426 |
| 2012/0306873 A1 | | 6/2012 | Sharp |
| 2012/0303660 A1 | | 11/2012 | Betzler |
| 2014/0168208 A1 * | | 6/2014 | Gottesman ............. G06T 15/20 |
| | | | 345/419 |
| 2016/0025981 A1 | | 1/2016 | Burns |
| 2016/0026253 A1 | | 1/2016 | Bradski |
| 2016/0217603 A1 | | 7/2016 | Jung |
| 2017/0287199 A1 | | 10/2017 | Makinen |
| 2017/0326457 A1 | | 11/2017 | Tilton |
| 2017/0330362 A1 | | 11/2017 | Sumner |
| 2018/0143756 A1 | | 5/2018 | Mildrew |
| 2018/0350133 A1 | | 12/2018 | Gervasio |
| 2019/0069000 A1 | | 2/2019 | Hou |
| 2019/0087067 A1 | | 3/2019 | Hovden |
| 2020/0134923 A1 | | 4/2020 | Seiler |
| 2020/0363815 A1 | | 11/2020 | Mousavian |

OTHER PUBLICATIONS

Extended European Search Report for corresponding Application 20209463.7, 10 pages, dated May 21, 2021.
Joshua D. Eno, et al., "Virtual and Real World Ontology Services" IEEE Computer Society, IEEE Internet Computing, vol. 15, No. 5, pp. 46-52, Sep. 1, 2011.
Marc Christie, et al., "Camera control in computer Graphics", Models, Techniques and Applications Course Notes, Siggraph Asia 2009, pp. 1-197, December 16, 2009.
Examination Report for corresponding application No. GB1918608.9, 5 pages, dated Jul. 25, 2022.

* cited by examiner

SYSTEM, METHOD AND STORAGE MEDIUM FOR IDENTIFICATION OF ONE OR MORE ASPECTS OF A VIRTUAL ENVIRONMENT

CROSS REFERENCE TO RELATED APPLICATIONS

This is a continuation application of U.S. patent application Ser. No. 17/114,596, accorded a filing date of Dec. 8, 2020, allowed, which claims priority to GB 1918608.9, filed Dec. 17, 2019, the entire disclosures of which are hereby incorporated by reference.

BACKGROUND OF THE INVENTION

Field of the Invention

This disclosure relates to a content generation system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years, the demand for high-quality video and video game content has increased. This is driven in part by the demand for immersive content, such as content for display with a virtual reality (VR) headset, as well as the fact that high-quality displays are more widespread amongst consumers. However, the provision of such content is associated with the requirement for ever-increasing processing power—and this may be problematic when using hardware that is not updated frequently (such as a games console) or is limited in processing power due to other considerations such as cost or portability. The provision of suitably immersive VR content in particular is associated with expensive image processing operations.

It is therefore considered that rather than relying on an increase in the capabilities of the hardware used to generate and provide such content, it may be preferable to optimise the content and/or the content generation process. By optimising the content and/or content generation process, it is anticipated that the amount of processing power that is required is reduced or the quality of content is improved while utilising the same amount of processing power. That is, the ratio of content quality to required processing power may be improved by the optimisation.

One manner in which this may be achieved is in that of reducing the amount of information used to represent one or more virtual environments or elements that are to be rendered for display to a viewer in one or more images. Many approaches may be taken that can assist with this—for instance, the image quality associated with one or more objects may be made dependent upon their importance to the scene. That is, an important object (such as the protagonist in a movie or a game) may be represented by a more detailed model than a less important object (such as a background object that has no particular relevance to the scene).

In some existing arrangements, an optimisation process may be performed in which content is modified (or otherwise pre-processed) to generate a more efficient representation of the content. For example, in a virtual environment it may be determined that an object is not able to be seen from any possible (or likely viewpoint)—and as a result the object may be identified for deletion. Such a process can be rather labour-intensive and time-consuming, and provide only a limited optimisation of the content. Such processes are therefore not seen as being particularly useful.

It is in the context of the above problems that the present disclosure arises.

SUMMARY OF THE INVENTION

It is to be understood that both the foregoing general description of the invention and the following detailed description are exemplary, but are not restrictive, of the invention.

This disclosure is defined by claim 1.

Further respective aspects and features of the disclosure are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Embodiments of the present invention provide a system and/or method for optimising a virtual environment (or a representation of such an environment). Optimisation here refers to a process which increases the efficiency of the content, such that the associated data is reduced in size or the rendering speed is increased (for example), rather than the generation of an ideal representation of that content.

For example, a number of vertices may be culled from the content—such that one or more objects or other features within the environment represented by the content are modified or deleted. This represents an optimisation in that a reduction in the number of vertices within the content means that the amount of information that is to be stored is reduced, and any subsequent use of the information may be more efficient as a result.

In earlier arrangements, a method by which culling of vertices is performed using a brute force search is proposed. In such arrangements, an agent (such as a computer controlled game avatar) is configured to take a random path through a virtual environment and to discover the geometry of the environment whilst traversing the environment.

These earlier methods are simple to implement, but can be inefficient—the associated processing time and power may be inappropriately high for widespread application. It is therefore considered that a more efficient approach may be preferred.

The present disclosure provides a system and method for providing an improved optimisation of the representation of a virtual environment by performing a more efficient culling of elements present in the virtual representation. This may be implemented using a machine learning based arrangement, in which a reinforcement learning agent is trained to provide an effective traversal and identification of the geometry of a virtual environment. The following disclosure provides a discussion of both the training and the use of such an agent.

Figure 1:
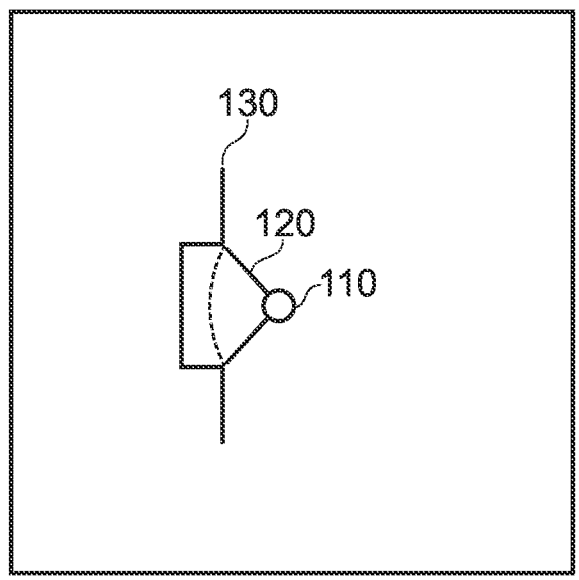
FIG. 1 schematically illustrates an initial position of a reinforcement learning agent in a virtual environment.

FIG. 1 schematically illustrates a starting location of a reinforcement learning agent within a virtual environment. This Figure shows the environment in a plan view, rather than using a three-dimensional representation, for clarity—although it should be understood that embodiments of the present disclosure may be applicable to any virtual environment as appropriate.

The virtual environment 100 as shown in FIG. 1 comprises limited geometry 130; this is indicative of the fact that this is an initial position of the reinforcement learning agent 110, and as such a limited discovery of the geometry within the environment 100 has been performed. In this Figure, the geometry 130 is taken as being walls within the environment 100 although of course this is entirely exemplary—the geometry 130 may be any object or the like.

The direction in which the reinforcement learning agent 110 is facing is indicated by the cone 120; only geometry which is within this cone 120 (or an extension of the cone 120, indicating an increased viewing distance), or has been present within the cone during the geometry identification process, is considered to be discovered by the reinforcement learning agent 110. The identification of geometry within an environment may be impacted by occlusions or the like within the environment, as this may interrupt the line of sight of the reinforcement learning agent—this means that not all geometry that appears within such a cone may be identified, in some embodiments.

Of course, as the reinforcement agent 110 navigates the environment 100 and/or performs other actions (such as rotations) that change the viewpoint of the agent 110 further geometry may be identified.

Figure 2:
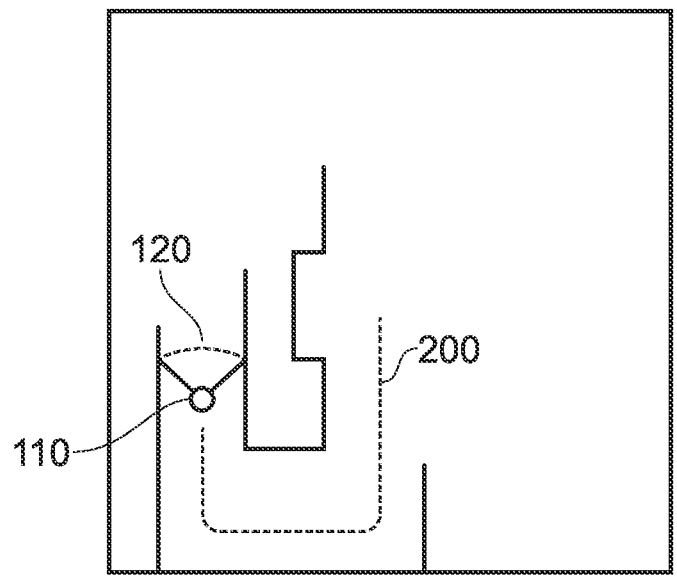
FIG. 2 schematically illustrates a subsequent position of a reinforcement learning agent in a virtual environment.

FIG. 2 schematically illustrates an example of the identified geometry following such a navigation by the agent.

In this Figure, the path taken by the agent 110 through the environment 100 is indicated by the dashed line 200. It is clear (from the unbroken lines within the environment 100) that additional geometry has been identified within the environment 100—this is indicated by the increase in the number of walls that are shown. The navigation of the reinforcement learning agent 110 may be performed in any suitable manner; in one example, the agent controls an in-game character or other in-content avatar and navigates the environment by providing inputs to control the motion and/or viewpoint of the avatar.

Here geometry refers to any surface, feature, or object that is visible within a virtual environment. These may be characterised with any suitable level of detail—for example, geometry may be identified on a per-object basis, a per-surface basis, and/or a per-vertex basis. The level of detail may be varied in dependence upon the application, one or more properties of the virtual environment (such as the type or size), and/or one or more properties of the feature that the geometry is associated with (such as significance or visibility).

The identification of geometry can be performed in any suitable manner. For example, image processing methods may be used to identify one or more objects or features that are visible from a particular viewpoint (that is, visible in an image that is displayed or would be displayed). Alternatively, or in addition, analysis may be performed that is able to identify one or more elements that would be visible to the reinforcement learning agent given a particular position and orientation.

In a training phase, the effectiveness of the reinforcement learning agent's behaviour in discovering geometry is evaluated. This evaluation can be based upon any suitable metric, and may be quantified in any of a number of ways. In embodiments of the present disclosure, the evaluation is indicative of the amount of geometry that is discovered within a given time period or using a given number of viewpoints. Similarly, the rate of discovery of geometry throughout the discovery process may also be considered in the evaluation.

Figure 3:
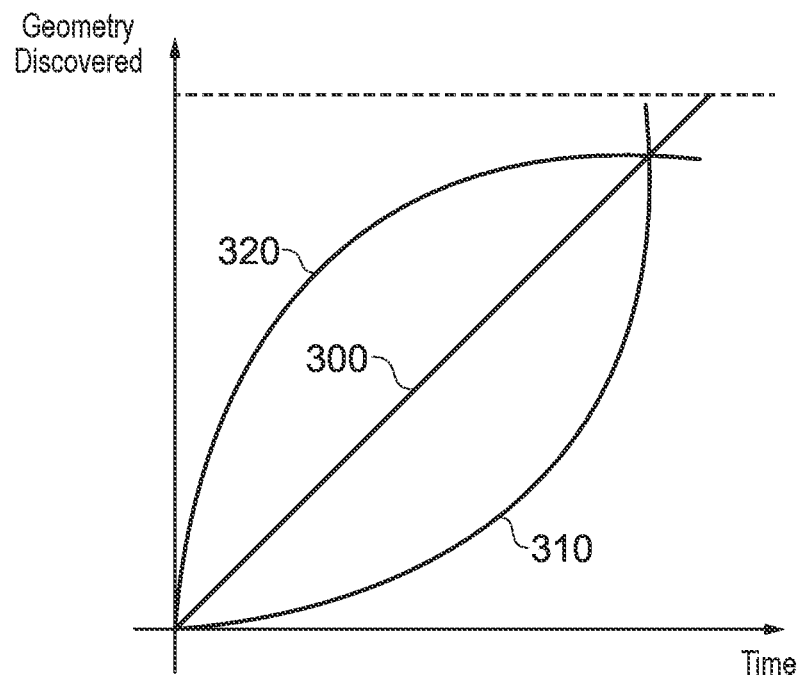
FIG. 3 schematically illustrates a behaviour evaluation.

FIG. 3 schematically illustrates examples of such a behaviour evaluation that measures the effectiveness (in terms of the discovery success rate) of the behaviour, using a graphical format. The vertical axis represents the proportion of the discoverable geometry within an environment that has been identified, with the threshold of 100% being indicated by a dashed horizontal line. The horizontal axis represents an elapsed time of the discovery process, which can be measured directly (such as number of seconds) or indirectly (such as number of viewpoints evaluated).

Discoverable geometry here refers to the geometry within an environment that is viewable from at least one viewpoint within the virtual environment. This may comprise a subset of the geometry within the environment, for example in the case in which occlusions or the like result in the complete obscuring of one or more objects.

A first curve 300 represents behaviour in which geometry is discovered at a constant rate throughout the discovery process. While such behaviour is clearly effective, as it results in the discovery of all of the discoverable geometry within the environment, it may not represent the optimal discovery behaviour.

A second curve 310 represents behaviour in which geometry is initially discovered slowly, but the rate at which the geometry is discovered increases over time. This may be preferable to the behaviour associated with the curve 300 in that the overall discovery time is reduced (that is, the threshold of 100% is reached at an earlier time); however, the low initial discovery rate may be inappropriate in a number of embodiments such as those in which a fixed-time discovery is performed.

A third curve 320 represents behaviour which results in an initial rapid discovery of geometry, followed by a decreasing rate of geometry discovery and a failure to identify all of the geometry in the environment. While such behaviour clearly does not provide the effectiveness of the behaviour represented by the curves 300 and 310, in that it does not reach the 100% threshold, there is an advantage in that the initial discovery rate of the geometry is substantially higher.

Of course, each of these curves represents an exemplary discovery evaluation and other shaped curves are possible. For example, there may be stepped portions within the curve (that is, horizontal portions or substantially horizontal portions) which indicate no new geometry being discovered within a time period. This may be a result of the reinforcement learning agent retracing its path in an environment, for example, or moving closer to already-identified geometry such that no new geometry is revealed.

The above discussion refers to viewpoints within an environment; these may be a set of discrete positions (and may have one or more associated orientations) within the virtual environment, and can be defined in any suitable manner. For example, the virtual environment could be pre-populated with a one or more viewpoints (for instance, including an initial viewpoint for the agent) based upon information about the size and/or shape of the virtual environment, or information about the navigable areas (such as using information identifying valid player positions within the environment).

Alternatively, or in addition, the viewpoints may be defined based upon the path taken (or expected to be taken) by the agent. The viewpoints may be defined as the agent moves, so as to define a new viewpoint after one or more of a threshold amount of motion, a threshold amount of discovered geometry, and a threshold amount of elapsed time.

In either case, the resulting set of viewpoints may comprise any distribution (uniform or non-uniform) of viewpoints within the virtual environment.

As discussed with reference to FIG. 3, the behaviour of an agent is evaluated to determine whether it represents an effective and/or efficient geometry discovery method. Various criteria may be considered when evaluating this, some of which are discussed below.

A first criterion is that of the completeness of the discovery process; that is, how effective the behaviour is in terms of the proportion of the geometry that is discovered. When applying this criterion, it is clear that behaviour which identifies a greater proportion of the geometry in the environment would be considered better than behaviour that identifies a lesser proportion.

Such a criterion may also be modified to consider the importance of the geometry that is discovered. For example, two differing behaviours may be ranked differently despite each identifying the same proportion of the geometry in the environment. That is, behaviour which identifies 70% of the geometry but fails to identify major geometry (that is, geometry which is considered to be particularly visible or important to the virtual environment) would be considered worse than behaviour in which 70% of the geometry was identified but the remaining 30% comprised only less-important geometry.

It is therefore considered that an appropriate effectiveness for a discovery process should be determined, in dependence upon the discovery behaviour that is utilised. Of course, the balance between the two factors (percentage of the geometry identified, and significance of the identified geometry) may be determined freely as appropriate for a given application or environment.

A second criterion that may be considered is that of the length of the discovery process associated with each of the behaviours. Of course, two processes that are equally effective in discovering geometry may be differentiated in dependence upon the time taken to discover the geometry; it is also considered that a process which discovers less geometry may be preferred if the process length is sufficiently lower. The relative parameters for preferred effectiveness and duration of a process may be selected freely so as to determine a preferred process.

The duration of a process is of course defined by the time of its termination. The selection of a suitable termination time may be based upon any number of criteria; for example, the termination time may be selected based upon the available time for the process, a threshold amount of geometry discovered, and/or a threshold rate of geometry discovery. A discovery process which terminates prematurely may be undesirable in that there may be a significant amount of geometry that fails to be identified; however, a discovery process which takes too long may be objectionable in that this both delays further processing and may represent an inefficient allocation of processing resources.

It is therefore considered that an appropriate length for a discovery process should be determined, in dependence upon the discovery behaviour that is utilised.

In some embodiments, an appropriate discovery process is determined using a machine learning based method. For instance, a discovery process may be generated or modified using a reinforcement learning agent to determine an efficient and effective behaviour for an agent for use in a geometry discovery process.

Figure 4:
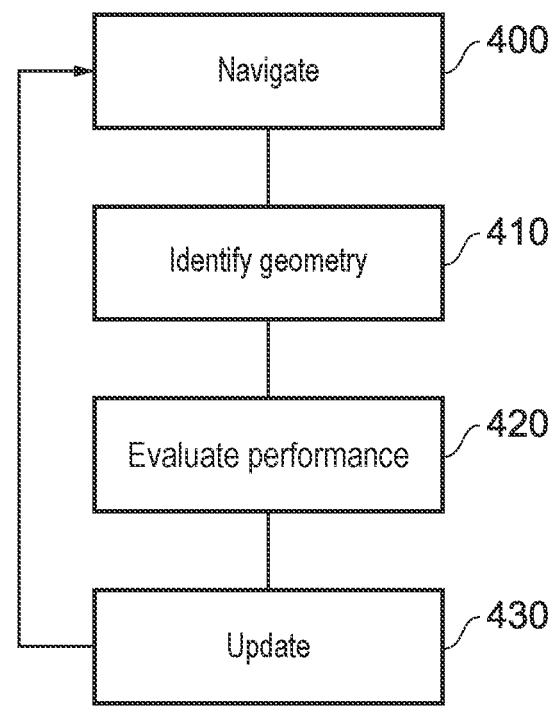
FIG. 4 schematically illustrates a training method.

FIG. 4 schematically illustrates a training method for developing such a discovery process. This may be performed using one or more virtual environments which are well-known, so as to enable a more accurate evaluation of the performance of the reinforcement learning agent.

At a step 400, the reinforcement learning agent navigates the virtual environment, for example by using an avatar or a controllable camera or the like. This may comprise any kind of behaviour that may change the viewpoint or the geometry that is able to be seen by the agent; for example, movement of the agent within the environment, a rotation of the viewpoint, or an action of jumping or the like to vary the height. Similarly, context-specific (such as specific to a particular game or the like) actions may be taken such as equipping binoculars or other vision-enhancing equipment that causes a change of view within the virtual environment, or interacting with one or more features of the virtual environment (such as doors).

Navigation of the virtual environment may be performed so as to cover any suitable proportion of the environment that is able to be reached by a user who is active within that environment. That is, the reinforcement learning agent is constrained to the parts of the virtual environment that a player of a game (for example) could also reach.

At a step 410, a geometry identification process is implemented for a viewpoint that is obtained via the navigation of step 400. This may comprise any suitable method for identifying the geometry in the scene—for example, image processing techniques to recognise objects, ray-tracing techniques from the viewpoint, or consulting data about the environment to identify visible geometry from that viewpoint. The identification may relate to either or both of the quantity of geometry that is visible and the context of the geometry that is visible, or any other suitable aspect of the geometry.

At a step 420, an evaluation is performed to determine the performance of the agent in respect of the geometry discovery process. This may comprise any suitable quantifying of the behaviour of the reinforcement learning agent, including measuring the total amount of geometry that has been discovered, the rate at which it is discovered, the duration of the process, and/or the significance of the geometry that has been discovered.

At a step 430, the reinforcement learning agent is updated in dependence upon the evaluation that is performed at step 420. This is often referred to as a reward—a positive evaluation is used to reinforce the behaviour that leads to that evaluation, with more positive behaviour (such as a greater rate of geometry discovery) leading to a greater reward. This updating of the reinforcement learning agent may result in a modification of future navigation or the like, leading to a more efficient or effective geometry discovering process (in dependence upon the rewards that are provided). The rewards that are assigned may also be time dependent, such that as the discovery process time increases the rewards decrease—in that way, the discovery of geometry as quickly as possible may be further incentivised.

To provide an example of such an update, consider the case in which a reinforcement learning agent retraces its steps within the virtual environment. Such a navigation is unlikely to reveal any new geometry, as the agent has already moved through that area—and therefore will have identified the geometry. This results in a reduced amount of geometry being discovered for each successive viewpoint, and a corresponding reduction in the geometry discovery rate. The evaluation of the performance will therefore be poor, leading to a small or negative reward being assigned in the update step. As a result, the likelihood of such behaviour being reproduced in future is reduced.

Such an example may be rather simplistic, of course, as other factors may be used to characterise the behaviour. Examples of such factors include the current percentage of geometry discovered, a recent or forecasted discovery of geometry (or an associated rate of discovery), the elapsed time of the process, or any other suitable factor. For instance, the doubling back of the agent may be only discouraged early on in the process but may actually be encouraged later (such as when it may be necessary in order to reach new areas of the virtual environment, and thereby discover more geometry).

Of course, as discussed above, the agent may also be rewarded for terminating the discovery process at a suitable time. This may take the form of a positive reward for terminating the process at an appropriate time, a negative reward for continuing with the search for longer than is appropriate, or both. While a number of possible metrics for termination of the process are described above, the agent may instead be trained so as to identify characteristics of the behaviour, navigation, and/or environment that correlate with these metrics.

For example, while the total geometry discovered may form a suitable metric in a known environment, this is not appropriate in an environment which is not well-known; therefore other aspects of the behaviour or process may be taken as being indicative of such a condition—for example, the agent may identify a retracing of its own steps or repeating of viewpoints an above-threshold amount as being indicative of having explored a particular proportion of the environment. Alternatively, or in addition, a failure of the agent to discover new geometry (or at least a threshold amount of geometry) for a given time period may be considered to be indicative of the search having been exhaustive (or at least sufficient).

Similarly, a decrease in the rewards earned by the agent may be indicative of an appropriate time to terminate the discovery process—for example, a below-threshold reward within a given timeframe may be taken to indicate that no new geometry is being discovered (or likely to be discovered).

Such a process may be suitable for generating a reinforcement learning agent that can be used to discover unknown environments, by reproducing one or more of the behaviours which are exhibited in the training process.

While a single reinforcement learning agent may be trained for general purpose geometry detection, it is also considered that different agents may be used for different applications. For example, agents may be defined in dependence upon how constrained the viewpoint is—effective behaviour for an agent that can only move in two dimensions may not represent effective behaviour for an agent that can move in three dimensions. Similarly, different environments may each have an associated behaviour that is more efficient or effective. For instance, the openness of an environment may be a factor—the behaviour that results in an effective discovery for the geometry may differ between an open, outdoor environment and a crowded or enclosed space.

As a further example, it is noted that an agent may be defined in dependence upon whether or not objects within the virtual environment are interactive. That is, the agent may have a different behaviour if interaction with the environment correlates with the effectiveness of the discovery process. Therefore the agents used for video game environments and immersive video environments may differ on account of this potential for interaction with objects or the like, for example.

While the above has been discussed with reference to a reinforcement learning agent, of course an analogous process may be implemented using any form of neural network agent. For example, rather than providing a rewards to a reinforcement learning agent one or more gradients may be defined or modified for a neural network agent.

Figure 5:
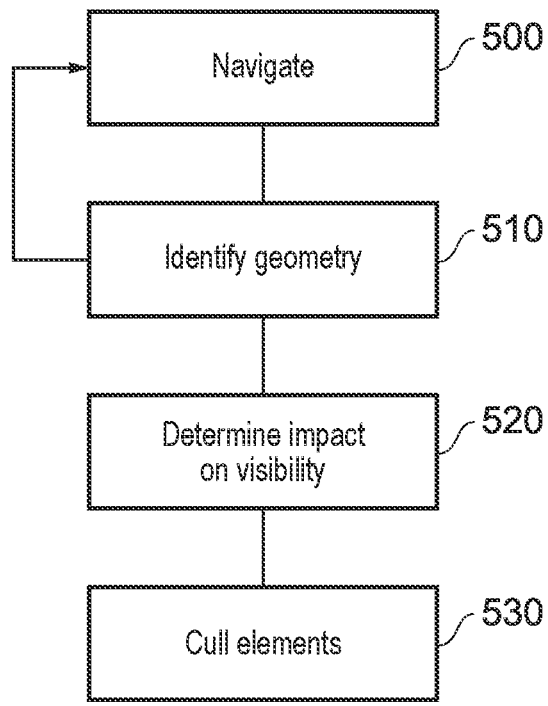
FIG. 5 schematically illustrates a virtual environment characterising method.

FIG. 5 schematically illustrates a method by which the trained reinforcement learning agent is used to characterise a new virtual environment. In some embodiments, a particular agent from one or more available agents may be selected in dependence upon their appropriateness for the particular virtual environment or the like.

At a step 500, navigation of the environment is performed. This navigation is performed in line with the behaviours of the reinforcement learning agent (or an equivalent) that are developed by the method of FIG. 4.

At a step 510, geometry is identified within a viewpoint that is obtained from the navigation of step 500. This may be performed using the methods described with reference to step 410 of FIG. 4, for example.

As shown in FIG. 5, the process may then return to step 500 so as to perform further navigation. This cycle of navigation and identification may be performed for any suitable duration of time or number of iterations as appropriate. An appropriate end condition may be determined by the selected agent, for example, and may relate to the geometry discovery rate or the like.

At a step 520, the impact on visibility is determined for the identified geometry. This is a measure of how important the geometry is to the virtual environment in terms of how often it is rendered or viewed. This may be determined on any suitable scale—for example, a per-object or per-vertex basis. The impact may be determined using any suitable metric; for example, the number of times that the geometry is rendered may be considered, or the number of viewpoints in which the geometry is visible.

That is, geometry that is more prominent within a virtual environment may have a higher impact on visibility (as the number of times it is likely to be seen is higher), while more obscured geometry has a lower impact on visibility. For example, an object in the middle of a room (or the vertices associated with that object) may have a high impact on visibility due to being able to be seen from a wide range of angles, while an object (or the associated vertices) which is under a desk in the corner of the room may have a low impact on visibility as it is likely occluded by the desk from many viewpoints.

While shown as occurring after the completion of the navigation/identification loop (steps 500 and 510), of course the impact on visibility could be at least partially determined during this loop. For example, the number of times that the geometry is rendered may be determined during the loop such that the impact can be determined dynamically throughout the process.

At a step 530, a culling process is performed on the geometry within the environment. In such a process, the vertices associated with one or more elements of the virtual environment may be culled from the model of the virtual environment (or another representation of the environment). This may be performed so as to generate a more efficient representation of the virtual environment, as the number of vertices may be reduced without a significant impact to the visual appearance of the environment when rendered.

The culling may be performed so as to remove any vertices that are not viewed (as above, this may instead be performed on a per-object basis or the like) during navigation of the virtual environment. Alternatively, the culling may include removing one or more vertices that are viewed an equal-to- or below-threshold number of times.

Other factors may also be considered, such that a weighting may be applied to each of the vertices or objects. For instance, the distance of a vertex from the viewpoint at the time of rendering may be considered, such that further away vertices are assigned a lower weighting than those vertices which are closer to the viewpoint. This may be indicative of the visual impact of the vertex, and therefore be a suitable criterion for assessing whether the vertex should be culled. This means that a vertex which is viewed fewer times (but from a closer viewpoint) may be considered to be more significant than a vertex which is viewed more times but from a further viewpoint.

Figure 6:
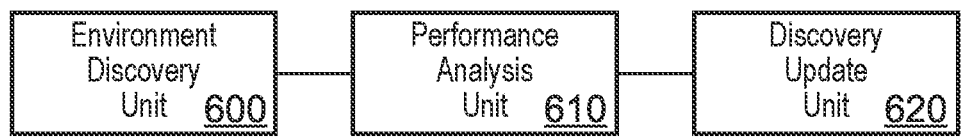
FIG. 6 schematically illustrates a system for improving a discovery process for a virtual environment.

FIG. 6 schematically illustrates a system for improving a discovery process for a virtual environment. As discussed above, in some embodiments this discovery process may be implemented using a reinforcement learning agent or any other suitable machine learning or artificial intelligence based system. The system of FIG. 6 comprises an environment discovery unit 600, a performance analysis unit 610, and a navigation unit 620.

The environment discovery unit 600 is operable to perform a discovery process comprising navigation of the virtual environment and identification of one or more aspects of the virtual environment. This may be performed in accordance with steps 400 and 410 as discussed above with reference to FIG. 4; for example, the process may include the manipulation of an avatar or controllable camera within the virtual environment so as to generate viewpoints, with the viewpoints themselves being analysed to identify geometry within the virtual environment.

The performance analysis unit 610 is operable to evaluate the effectiveness of the discovery process. This may be performed in accordance with step 420 of FIG. 4 as discussed above; the purpose being that the behaviour (that is, the characteristics of the navigation) exhibited in the discovery process is able to be assigned a value based upon its effectiveness and/or efficiency.

The discovery update unit 620 is operable to modify future operation of the environment discovery unit 600 in dependence upon the evaluation. That is, the discovery process may be tailored so as to preferentially reproduce behaviour that is associated with a positive evaluation—this is discussed above with reference to step 430 of FIG. 4. This may result in a more efficient and/or effective process, if the evaluation and update processes are well-defined.

As discussed above, this update process may comprise the updating of a reinforcement learning agent or the like in an iterative manner so as to generate an agent that provides an efficient and effective discovery process. In such embodiments, the future operation of the environment discovery unit 600 may be considered to comprise behaviour of the reinforcement learning agent, for example, such as patterns in how the viewpoints are generated within the virtual environment.

The arrangement of FIG. 6 is an example of a processor (for example, a GPU and/or CPU located in a games console or any other computing device) that is operable to improve a discovery process for a virtual environment, and in particular is operable to:

perform a discovery process comprising navigation of the virtual environment and identification of one or more aspects of the virtual environment;

evaluate the effectiveness of the discovery process; and modify future discovery processes in dependence upon the evaluation.

Figure 7:
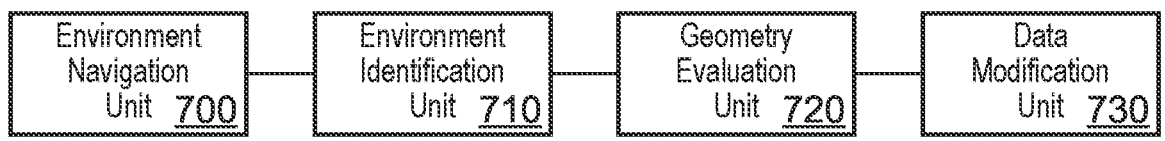
FIG. 7 schematically illustrates system for modifying data representing a virtual environment.

FIG. 7 schematically illustrates system for modifying data representing a virtual environment. This may use the process as defined or trained using the system of FIG. 6, for example. As is apparent from the above discussion, in some embodiments the system of FIG. 7 may utilise a trained reinforcement learning agent to perform on or more elements of the processing. The system of FIG. 7 comprises an environment navigation unit 700, an environment identification unit 710, a geometry evaluation unit 720, and a data modification unit 730.

The environment navigation unit 700 is operable to control navigation within the virtual environment to generate one or more viewpoints within the virtual environment. As noted above, for example with reference to step 500 of FIG. 5, the environment navigation unit 700 may be operable to navigate a virtual environment using an avatar or controllable camera within the virtual environment. The environment navigation unit 700 may also be operable to implement one or more interactions with one or more features within the virtual environment—for example, moving objects or otherwise interacting with them so as to vary the geometry that is seen from a given viewpoint.

The environment identification unit 710 is operable to identify one or more aspects of the geometry of the virtual environment visible in the one or more viewpoints. The environment identification unit 710 may be operable to identify one or more objects and/or vertices as aspects of the geometry, for example. This may be performed using any suitable method, such as those discussed with reference to step 510 of FIG. 5.

The geometry evaluation unit 720 is operable to evaluate the visibility of one or more aspects of the geometry based upon the identification for each of one or more viewpoints. This can be performed in any suitable manner, such as those discussed with reference to step 520 of FIG. 5 above. In some embodiments, the geometry evaluation unit 720 is operable to evaluate the visibility of an aspect in dependence upon the number of times it is identified. As noted above, the aspects may refer to any suitable geometry feature, such as one or more objects and/or vertices.

In some embodiments, the geometry evaluation unit 720 is operable to apply a weighting to the evaluation in dependence upon the distance from a viewpoint to a visible aspect. The weighting to be applied may be determined in view of any suitable criteria—for example, criteria such as the impact on visibility that the distance has, or how aggressive the culling process is intended to be.

The data modification unit 730 is operable to modify one or more elements of data representing the virtual environment. This may comprise any suitable modification or deletion of any number of elements of the virtual environment, such as specific objects or vertices. Examples of such processing are discussed above with reference to step 530 of FIG. 5.

In some embodiments, the data modification unit 730 is operable to modify elements of data by culling one or more vertices. This may include the data modification unit 730 being operable to cull vertices that are identified (by the environment identification unit) an equal to or lower than threshold number of times, with the threshold able to be determined as appropriate for that arrangement. In some embodiments the threshold may be zero, while in others is may be any other number.

Of course, this process may be modified to incorporate a measure of the significance of the vertices—for instance, a multiplying factor may be applied that takes into account the visibility or contextual significance of an aspect such as an object or vertex. That is to say that the number of times that a vertex (or other aspect) has been identified may be defined as 'the number of times the aspect is identified, multiplied by an aspect significance factor, multiplied by a visibility weighting'; of course the specific calculation may be specified freely so as to obtain a desired result.

As has been discussed in numerous passages above, the processing associated with one or more of the environment navigation unit 700, environment identification unit 710, geometry evaluation unit 720, and/or data modification unit 730 may be implemented using a trained reinforcement learning agent or any other suitable neural network or the like. This may be advantageous in that the operational parameters, such as the behaviour exhibited by the navigation unit 700, may be improved using a feedback mechanism. By using a system according to FIG. 6, for example, the reinforcement learning agent may be trained to improve one or more of the efficiency, effectiveness, and duration of the data modification process.

The arrangement of FIG. 7 is an example of a processor (for example, a GPU and/or CPU located in a games console or any other computing device) that is operable to modify data representing a virtual environment, and in particular is operable to:

control navigation within the virtual environment to generate one or more viewpoints within the virtual environment;

identify one or more aspects of the geometry of the virtual environment visible in the one or more viewpoints;

evaluate the visibility of one or more aspects of the geometry based upon the identification for each of one or more viewpoints; and modify one or more elements of data representing the virtual environment.

Figure 8:
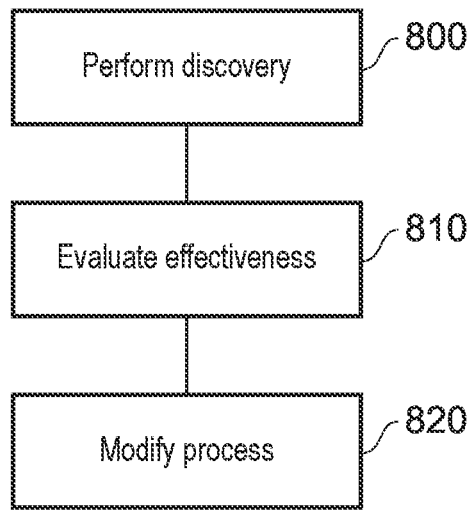
FIG. 8 schematically illustrates a method for improving a discovery process for a virtual environment.

FIG. 8 schematically illustrates a method for improving a discovery process for a virtual environment.

A step 800 comprises performing a discovery process comprising navigation of the virtual environment and identification of one or more aspects of the virtual environment. This may be implemented in line with steps 400 and 410 of FIG. 4, for example.

A step 810 comprises evaluating the effectiveness of the discovery process. This evaluation may be performed in line with the discussion above relating to step 420 of FIG. 4, for example.

A step 820 comprises modifying future discovery processes in dependence upon the evaluation. This may correspond to the updating discussed with reference to step 430 of FIG. 4, for example.

Figure 9:
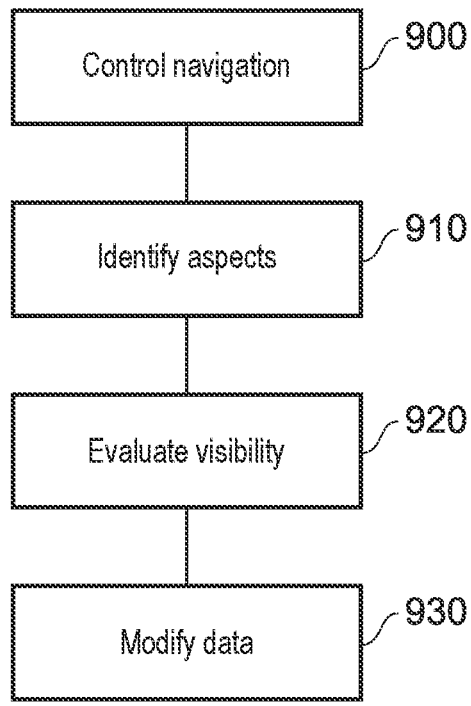
FIG. 9 schematically illustrates a method for modifying data representing a virtual environment.

FIG. 9 schematically illustrates a method for modifying data representing a virtual environment.

A step 900 comprises controlling navigation within the virtual environment to generate one or more viewpoints within the virtual environment. This step may correspond to step 500 of FIG. 5, for example.

A step 910 comprises identifying one or more aspects of the geometry of the virtual environment visible in the one or more viewpoints. This step may correspond to step 510 of FIG. 5, for example.

A step 920 comprises evaluating the visibility of one or more aspects of the geometry based upon the identification for each of one or more viewpoints. This step may correspond to step 520 of FIG. 5, for example.

A step 930 comprises modifying one or more elements of data representing the virtual environment. This step may correspond to step 530 of FIG. 5, for example, which discusses a vertex culling method.

As described above, such a method may enable a more efficient and/or effective culling process to be performed for a virtual environment. This can lead to the generation of a more efficient representation of a virtual environment, increasing the efficiency of an associated rendering process as well as reducing the data storage burden for the data representing the environment.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The invention claimed is:

1. A system for improving a discovery process for a virtual environment, the system comprising:
   an environment discovery unit operable to perform a discovery process comprising navigation of the virtual environment and identification of one or more aspects of a geometry of the virtual environment;
   a performance analysis unit operable to evaluate the effectiveness of the discovery process; and
   a discovery update unit operable to modify future operation of the environment discovery unit in dependence upon the evaluation.

2. The system of claim 1, wherein the environment discovery unit is operable to manipulate an avatar or controllable camera within the virtual environment so as to generate viewpoints.

3. The system of claim 2, wherein the manipulation comprises a varying of the height, position, and/or rotation of the avatar or controllable camera, and optionally comprises changing one or more parameters of the view, the one or more parameters including a level of zoom.

4. The system of claim 2, wherein the avatar or controllable camera is constrained to parts of the virtual environment that are able to be reached by a human-controlled avatar during gameplay.

5. The system of claim 1, wherein the environment discovery unit is operable to implement one or more object recognition processes and/or ray-tracing techniques for the identification of the one or more aspects of the geometry of the virtual environment.

6. The system of claim 1, wherein the environment discovery unit is operable utilise information about the virtual environment to identify geometry of the virtual environment visible from one or more of the viewpoints.

7. The system of claim 1, wherein the environment discovery unit is operable to identify one or more objects and/or vertices as the one or more aspects of the geometry of the virtual environment.

8. The system of claim 1, wherein the performance analysis unit is operable to identify a total amount of geometry of the virtual environment that has been discovered, the rate at which the geometry of the virtual environment is discovered, the duration of the discovery process, and/or the significance of the geometry of the virtual environment that has been discovered.

9. The system of claim 1, wherein the discovery update unit is operable to modify the future operation so as to improve the effectiveness of the discovery process.

10. The system of claim 1, wherein the discovery update unit is operable to modify the future operation so as to improve the efficiency of the discovery process.

11. The system of claim 1, wherein the discovery update unit is operable to modify the future operation so as to reduce the duration of the discovery process.

12. The system of claim 1, wherein the discovery update unit is operable to modify the future operation so as to vary the navigation of the virtual environment.

13. The system of claim 1, wherein the discovery update unit is operable to modify the future operation so as to vary the conditions for termination of the discovery process.

14. The system of claim 1, wherein the processing is performed in an iterative manner so as to modify the future operation of the environment discovery unit two or more times in succession.

15. A computer implemented method for improving a discovery process for a virtual environment, the method comprising:

performing a discovery process comprising navigation of the virtual environment and identification of one or more aspects of a geometry of the virtual environment;

evaluating the effectiveness of the discovery process; and modifying future discovery processes in dependence upon the evaluation.

16. A non-transitory machine-readable storage medium which stores computer software which, when executed by a computer, causes the computer to perform a method for improving a discovery process for a virtual environment, the method comprising:

performing a discovery process comprising navigation of the virtual environment and identification of one or more aspects of a geometry of the virtual environment;

evaluating the effectiveness of the discovery process; and modifying future discovery processes in dependence upon the evaluation.

* * * * *